May 19, 1942.  E. T. LESSIG  2,283,743
TESTING RESILIENT MATERIAL
Filed March 3, 1939
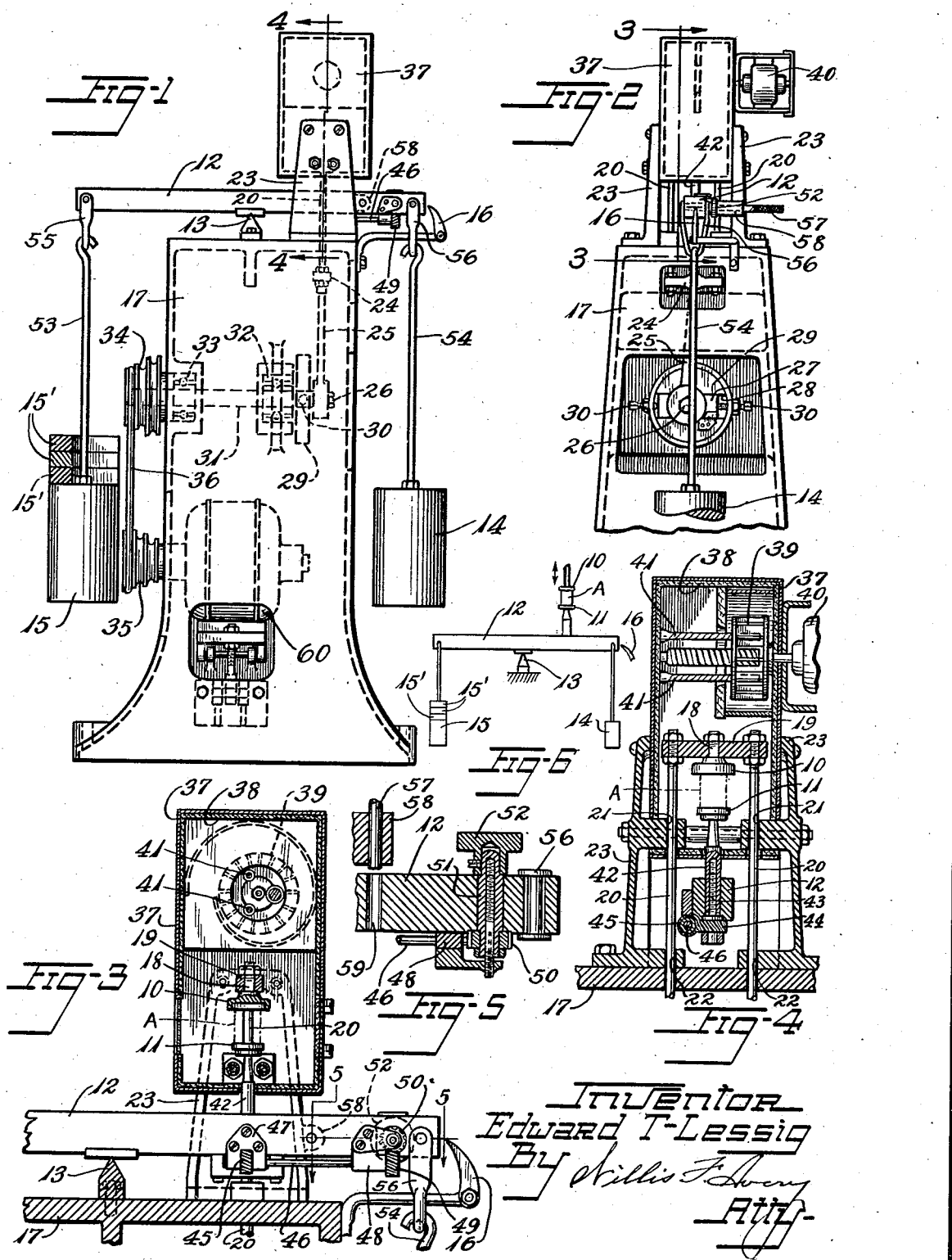
Inventor
Edward T. Lessig Patented May 19, 1942

2,283,743

UNITED STATES PATENT OFFICE 2,283,743

TESTING RESILIENT MATERIALS

Edward T. Lessig, Akron, Ohio, assignor to The
B. F. Goodrich Company, New York, N. Y., a
corporation of New York Application March 3, 1939, Serial No. 259,560

5 Claims. (Cl. 73—51)

This invention relates to the testing of resilient materials such as resilient rubber and other rubber-like materials, including composite structures of such materials in association with fabric or other reinforcement. The invention is useful especially in determining hysteresis properties of the material when subjected to repeated flexure, and it is useful in the study of heat generation and fatigue of the materials at both normal and elevated temperatures.

Flex testing has been commonly performed heretofore by inserting a test sample of the material under compression between eccentrically mounted plates and rotating one of the plates usually until the sample ruptured or blew out as a result of the heat generated internally of it because of the continued flexure. It may be stated that a blowout in a solid mass of rubber is caused by the development of high temperatures internally of the mass causing decomposition, the creation of liquid and gaseous substances, and finally rupture of the solid wall of the mass by the expansion of these products of decomposition. In large masses under heavy loads the temperatures attained have been so high that ignition of the gases has at times occurred spontaneously.

Machines for flex-testing materials heretofore have had disadvantages and limitations which the present invention overcomes.

The prior procedures and apparatus have not been such as to make possible the effective testing of pieces small enough to be cut from finished products such as pneumatic tire treads, and they have not been effective for testing pieces of composite material such as fabric reinforced rubber. Also, where off-center rotation has been used, large horizontal forces have been encountered acting in the direction laterally of the compression of the test pieces and tending to cause slipping of the test pieces, so that large loads have been required to prevent such slipping. Under such conditions the test pieces usually have developed very high temperatures and have blown out in an undesirably short time so that it has been difficult to study the test piece during the building up of the high temperatures. So far as I am aware, prior testing methods have not been available for measuring the temperature rise at equilibrium under less severe flexing conditions.

The chief objects of the invention are to overcome these and other difficulties, to provide improved procedure and apparatus for flex-testing materials of the kind referred to, to provide for the application of light loads at high frequency vibrations of low amplitude, as well as heavy loads at large deflections, and to provide conveniently for varying these factors as desired.

Further objects are to provide effectively for testing under a constant applied load, a constant initial compression, or at a constant deflection during the test, as desired, and to provide conveniently for observing dimensional changes in the test pieces during the test, the degree of softening or stiffening, and the effects of anisotropic differences in structure, and modulus changes over a range of temperatures.

Still further objects are to provide for testing pieces of the same size that may be obtained directly from manufactured articles and to provide for testing pieces of composite material, such, for example, as fabric reinforced rubber, as well as pieces of the un-reinforced material.

These and further objects will be apparent from the following description, reference being had to the accompanying drawing in which:

Fig. 1 is a side elevation of apparatus constructed according to and embodying the invention.

Fig. 2 is a front elevation with parts broken away, of the apparatus of Fig. 1.

Fig. 3 is a section taken along the line 3—3 of Fig. 2.

Fig. 4 is a section taken along the line 4—4 of Fig. 1.

Fig. 5 is a section taken along the line 5—5 of Fig. 3.

Fig. 6 is a simplified diagrammatic view of the apparatus of Fig. 1 illustrating a feature of the invention.

In general, the objects hereinbefore stated are attained according to the preferred manner of carrying out the invention by applying a definite compressive load to the bottom face of a test piece through a lever system having a high inertia, impressing on the upper face of the sample a high frequency cyclic compression of a definite amplitude, and measuring with a thermocouple the temperature rise at the base of the sample. The inertia of the lever system is preferably sufficiently high, and the natural period thereof sufficiently low so that very little or none of the high frequency vibration, applied at the other end of the sample, is transmitted to the loading lever. Provision is made however for the lever to move to maintain the load on the sample during slow dimensional changes in the sample caused by permanent set and other structural variations.

The construction and operations of the apparatus illustrated in the drawing will perhaps be best understood by reference first to the diagrammatic illustration of Fig. 6. A sample A of the material to be tested is inserted between upper and lower anvils 10 and 11, resting freely against these anvils. Preferably these anvils are surfaced with hard rubber or other suitable material. The upper anvil 10 is suitably connected to an eccentric driving means adapted to reciprocate the anvil in the vertical direction. The lower anvil 11 is suitably supported upon a lever 12 having a centrally located knife-edge fulcrum at 13 and inertia weights 14 and 15 suspended at its ends at positions equidistant from the fulcrum. A pointer 16 and an associated reference mark on the lever 12 facilitates maintaining the lever in a horizontal position during a test.

Additional weights 15', 15' are added to the lever at the side of the fulcrum opposite the anvil 11 to apply a definite compressive load to the bottom of the sample. The weights suspended from the inertia bar 12 provide a high inertia to the lever system, so that when the upper anvil 10 is reciprocated vertically its movements are transmitted to the test piece A while the lower face of the sample and the lever system partake of little or none of such movement, owing to the high inertia of the system and the fact that the vibration applied to the test piece is of a materially higher frequency than the normal frequency of vibration of the lever system. As the sample softens or stiffens or changes dimensions during the test, the anvil 11 follows the test piece and maintains a constant load against the piece unless the operator makes adjustments during the test to avoid this.

Referring now to the illustrative embodiment of Figs. 1 to 5, parts corresponding to those of Fig. 6 are similarly designated.

The knife-edge fulcrum 13 which supports the lever system, is mounted upon a base casing 17 which houses and supports driving mechanism for reciprocating the upper anvil 10 at the desired frequency. The upper anvil 10 is supported by means of the bolt 18 from a crosshead 19 which is supported by means of a pair of rods 20, 20. The rods 20, 20 are guided by vertical reciprocation at 21, 21 and 22, 22 in a frame 23 mounted upon the base casing 17, and these rods pass through the top of the casing and are connected to a lower crosshead 24 which is supported and reciprocated by a connecting rod 25 mounted upon an eccentric 26. The pintle of the eccentric upon which the connecting rod 25 is mounted is carried by a block 27 slidably adjustable in a slot 28 in a disk 29. The throw of the eccentric is adjustable by moving the block 27 in the slot and securing it in the adjusted position by means of set screws 30, 30. The disk 29 is mounted upon a shaft 31 journaled in bearings 32, 33 in the casing 17 and this shaft projects from the side of the casing where it is driven through multi-grooved pulleys 34, 35 connected by a belt 36 for speed changing, the pulley 35 being driven as by the motor 60 mounted in the lower portion of the casing.

At the top of the casing is mounted an oven 37 enclosing the test piece A, this oven being mounted upon the casing 17 by the frame 23 which preferably is in the form of two spaced-apart brackets as shown secured to the oven. The oven is in the form of a box suitably lined with asbestos 38 or other suitable material at top, bottom and all four sides. In the upper portion of the oven is mounted a blower 39 driven as by a motor 40 positioned outside the oven for circulating air within the oven to maintain a constant temperature. Electrical heating elements 41, 41 are provided at the discharge port of the blower to raise the temperature of the air to the degree desired, which heating elements are suitably connected to a source of power (not shown).

The lower anvil 11 is carried by a support 42 mounted upon the lever bar 12 and is vertically movable through an aperture in the bottom of the oven. For the purpose of adjusting the anvil 11 vertically with respect to the lever bar 12 the support 42 is vertically movable in an aperture in the bar. Movement of the support 42 is effected by means of a screw 43 internally threaded in the support and driven by a worm 44 and pinion 45 mounted upon a shaft 46 suitably journaled in brackets 47, 48 mounted upon the bar. Mounted upon the other end of the shaft 46 a worm 49 engaging a pinion 50 which is mounted upon a short shaft 51 extending transversely through the bar 12 and having as its outer end a knob 52 for hand rotation. The construction and arrangement is such that by turning the knob 52 a fine adjustment of the anvil 11 vertically with respect to the bar 12 is provided through the shafts, pinions and worm gears above described.

When not in use the lever bar 12 may be locked against movement by a pin 57 slidable in an ear 58 on the frame 23 and engageable in an aperture 59 in the bar.

The weights 14, 15 and 15' are suspended from the bar 12 through rods 53, 54 hooked at their upper ends to straps 55, 56 loosely pivoted in the bar 12.

The operation of the apparatus will be apparent from the foregoing description, and may be summarized as follows:

A test piece A is placed between the anvils 10, 11, and after adjustment of the height of the lower anvil by means of the knob 52, the desired compressive load is applied by adding weights 15' upon the weight 15, the compression resulting from the applied load preferably being read by returning the bar 12 to its horizontal position by rotation of the knob 52. The weights 14, 15, 15' provide the lever system with a high moment of inertia, and when the upper anvil is vertically restricted at high frequency by means of the eccentric and drive described, the lower face of the sample and the anvil 11 are maintained without substantial movement while the upper part of the sample is subjected to the impressed vibration. The temperature rise of the test piece may be measured at the base of the sample by means of a thermocouple (not shown). In order to keep the test piece in contact with the anvils during the entire compression cycle, the total length of the compression stroke should be less than about twice the initial compression of the test piece. The length of the compression stroke is adjusted by moving the adjustable block 27 of the eccentric to vary the throw of the latter.

Because of the high inertia and low natural period of the lever system little or no high frequency vibration is transmitted to the lever bar 12, although the lever does move to compensate for the slow changes in the test piece caused by permanent set and other structural changes. Light loads and high frequency vibrations of low amplitude cause the temperature of the sample to rise to some equilibrium value. Heavier loads and large deflections may be applied to produce a complete breakdown of the sample. Samples may be tested under a constant applied load, a constant initial compression, or at a constant deflection during the test. The change in height of the test piece can be measured continuously during flexure and the degree of softening or stiffening, the effect of anisotropic differences in structure or modulus changes over a range of temperatures can also be observed. These observations can be made conveniently because the lever bar 12, adjustable by the knob 52 to determine changes in height, is not subjected to the test vibration, but nevertheless maintains the applied load at all times against the sample.

Variations may be made without departing from the scope of the invention as it is defined in the following claims:

I claim:

1. The method of vibration testing an article of flexible material which method comprises the steps of maintaining a floating and substantially constant, applied load of high inertia to the article at a portion thereof while the load is unrestrained against movement except by its high inertia, and subjecting another portion of the article under said load to vibration at high frequency above the natural resonance frequency of the loaded article such that the first said portion of the article remains substantially stationary while the other said portion moves with the impressed vibration.

2. The method of vibration testing an article of flexible material, which method comprises maintaining a floating and substantially constant, applied compressive load of high inertia against one of two opposed faces of the material while the load is unrestrained from movement except by its high inertia, and subjecting the material at its other of said faces to vibration at high frequency above the natural resonance frequency of the loaded article such that the first said face of the material remains substantially stationary during the vibration of the material at the other face.

3. Apparatus for vibration testing an article of flexible material, said apparatus comprising means for applying a floating and substantially constant load of high inertia to a portion of the article while the load is unrestrained against movement except by its high inertia, and means for subjecting another portion of the article under said load to vibration at high frequency above the natural resonance frequency of the loaded article such that the first said portion of the article remains substantially stationary while the other said portion moves with the impressed vibration.

4. Apparatus for vibration testing an article of flexible material, said apparatus comprising means including a floating lever system of high inertia for applying a substantially constant load to a portion of the article while the load is unrestrained against movement except by its high inertia, and means for subjecting another portion of the article under said load to vibration at high frequency above the natural resonance frequency of the loaded article such that the first said portion of the article remains substantially stationary while the other said portion moves with the impressed vibration.

5. Apparatus for vibration testing an article of flexible material, said apparatus comprising means including a floating lever system of high inertia bearing against a face of the article for applying a substantially constant compressive load to said face of the article while the load is unrestrained against movement except by its high inertia, and means for subjecting the article at its opposite face to vibration at high frequency above the natural resonance frequency of the loaded article such that the first said face of the article remains substantially stationary while the other said face moves with the impressed vibration.

EDWARD T. LESSIG.